United States Patent
Shrivastava et al.

(10) Patent No.: US 12,309,668 B2
(45) Date of Patent: May 20, 2025

(54) METHODS AND SYSTEMS FOR ENERGY EFFICIENT AND SYNCHRONIZED RECEPTION OF MBS IN 5G COMMUNICATION NETWORK

(71) Applicant: Samsung Electronics Co., Ltd., Suwon-si (KR)

(72) Inventors: Vinay Kumar Shrivastava, Bangalore (IN); Fasil Abdul Latheef, Bangalore (IN); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 607 days.

(21) Appl. No.: 17/508,500

(22) Filed: Oct. 22, 2021

(65) Prior Publication Data
US 2022/0132277 A1    Apr. 28, 2022

(30) Foreign Application Priority Data

Oct. 22, 2020  (IN) .............................. 202041046157
Oct. 8, 2021   (IN) .............................. 2020 41046157

(51) Int. Cl.
*H04W 4/06*    (2009.01)
*H04W 76/28*   (2018.01)

(52) U.S. Cl.
CPC ............. *H04W 4/06* (2013.01); *H04W 76/28* (2018.02)

(58) Field of Classification Search
CPC ...... H04L 1/1812; H04L 1/1848; H04W 4/06; H04W 72/23; H04W 76/11; H04W 76/28; H04W 76/40; H04W 72/30; Y02D 30/70
See application file for complete search history.

(56) References Cited

U.S. PATENT DOCUMENTS

2013/0294320 A1    11/2013  Jactat et al.
2018/0049006 A1*    2/2018  Hong ...................... H04L 67/60
(Continued)

FOREIGN PATENT DOCUMENTS

CN    109413732 A    *    3/2019    ............ H04W 56/00
EP       3148270 A1   *    3/2017
(Continued)

OTHER PUBLICATIONS

Wu, "A Timer Method, Configuration Method and Device," English Machine Translation of Wu (CN 109413732 A), Clarivate Analytics, pp. 1-22. (Year: 2024).*
Futurewei; Discuss dynamic change of MBS delivery method; 3GPP TSG-RAN WG2 Meeting #111e; R2-2007551; Aug. 17-28, 2020; E-Conference.
(Continued)

*Primary Examiner* — Marcus Smith
*Assistant Examiner* — Kai Chang
(74) *Attorney, Agent, or Firm* — Jefferson IP Law, LLP

(57) ABSTRACT

The disclosure relates to a pre-5th generation (5G) or 5G communication system for supporting higher data rates beyond a 4th generation (4G) communication system such as long term evolution (LTE). A method performed by a network entity for handling a multicast and broadcast service (MBS) in a 5G communication network is provided that includes receiving a request for receiving at least one multicast service from a user equipment (UE), which includes at least one of a session join request or a service request, configuring the at least one multicast service based on the request, and sending the at least one multicast service to the UE over a radio resource control (RRC) reconfiguration message, which includes at least one of a point-to-multipoint (PTM) bearer configuration for a point-to-point (PTP) mode, a PTP bearer configuration for a PTP mode, or a split bearer configuration for a split bearer mode.

20 Claims, 13 Drawing Sheets

(56) References Cited

U.S. PATENT DOCUMENTS

| | | | | |
|---|---|---|---|---|
| 2018/0167881 A1* | 6/2018 | Lee | ................... | H04W 52/0216 |
| 2018/0248708 A1* | 8/2018 | Won | ........................ | H04W 4/06 |
| 2019/0222969 A1 | 7/2019 | Fujishiro et al. | | |
| 2020/0120455 A1 | 4/2020 | Wang et al. | | |
| 2020/0252900 A1 | 8/2020 | Kim et al. | | |
| 2021/0058945 A1* | 2/2021 | Zhang | ................... | H04L 1/1854 |
| 2021/0315046 A1* | 10/2021 | Xue | ........................ | H04L 69/24 |
| 2021/0360448 A1* | 11/2021 | Kim | ........................ | H04L 5/0053 |
| 2022/0046682 A1* | 2/2022 | Zhang | ............... | H04W 72/1268 |
| 2023/0269695 A1* | 8/2023 | Thomas | ................ | H04L 5/0051 |
| | | | | 455/456.1 |
| 2023/0388972 A1* | 11/2023 | Chang | ..................... | H04W 4/06 |

FOREIGN PATENT DOCUMENTS

| | | |
|---|---|---|
| EP | 3 346 736 A1 | 7/2018 |
| WO | 2016/119212 A1 | 8/2016 |
| WO | 2018/094252 A1 | 5/2018 |

OTHER PUBLICATIONS

Huawei; Dynamic switch between PTP and PTM; 3GPP TSG-RAN3 Meeting #109-e; R3-204692; Aug. 17-28, 2020; E-Conference.

International Search Report with Written Opinion dated Jan. 21, 2022; International Appln. No. PCT/KR2021/014969.

Indian Office Action dated Jun. 7, 2022; Indian Appln No. 202041046157.

\* cited by examiner

METHODS AND SYSTEMS FOR ENERGY EFFICIENT AND SYNCHRONIZED RECEPTION OF MBS IN 5G COMMUNICATION NETWORK

CROSS-REFERENCE TO RELATED APPLICATION(S)

This application is based on and claims priority under 35 U.S.C. § 119(a) of an Indian Provisional application number 202041046157, filed on Oct. 22, 2020 in the Indian patent office, and of an Indian Non-Provisional application number 202041046157, filed on Oct. 8, 2021, in the Indian patent office, the disclosure of each of which is incorporated by reference herein in its entirety.

BACKGROUND

1. Field

The disclosure relates to a Fifth Generation (5G) communication network. More particularly, the disclosure relates to methods and systems for energy efficient and synchronized reception of multicast/broadcast services in the 5G communication networks.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G new radio (NR) is targeting support for multicast and broadcast services (MBS) in its Release 17 version of specification being prepared by a $3^{rd}$ generation partnership project (3GPP). In legacy, Multimedia Broadcast Multicast Services (MBMS) were supported in LTE 4G wireless systems. However, the architecture and the requirements of the 5G MBS could be very different and there is an effort in the direction of designing the architecture for the network as well as the user equipment (UE) is in progress.

Specifically, multicast services refer to services being transmitted and availed by a set of UEs registered to a group, for example, a mission critical push-to-talk (MCPTT) service. Broadcast services refer to services being transmitted and being made available to all the UEs in a specific coverage area where broadcast is performed and typically and the UE may not need to be registered. Therefore, effectively, both multicast and broadcast services are point-to-multipoint (PTM) services as there is one transmitter and multiple recipient of contents. It is also possible to provide multicast and broadcast services in a point-to-point (PTP) manner, wherein there are multiple PTP connections to share the same MBS services with multiple recipients.

Apart from Multicast and Broadcast services, there are another category of services termed as Unicast services, which is meant for one recipient only for this is one to one dedicated connection between transmitter and receiver.

It is possible to have PTM bearer, PTP bearer or a combination of PTM and PTP bearer to carry the same MBS service. Combination of PTM and PTP bearer may provide a lot of features with respect to increase reliability of reception of MBS service packets, efficient switching between these two modes of reception when needed, e.g., because of mobility, network loading conditions or based on the user request density for the reception of the MBS service and accordingly network may decide the delivery modes and/or switching across. The bearer configuration as referred to herein has possibly both legs of PTM and PTP is termed as MBS split bearer.

Discontinuous reception (DRX) is the approach utilized during service data reception by the UE in which the UE follows a duty cycle to be awake for reception in ON period and sleep during OFF period. Moreover, some additional timers like inactivity timer is configured and utilized to keep track of data reception and extend the ON duration if data reception continues. When the inactivity timer expires, i.e., no new data is being received for stipulated timer period, the UE goes to OFF state and saves power. Besides inactivity timer, there may be certain other timers and parameters which can help track the reception operation and control the ON and OFF periods, e.g., hybrid automatic repeat request (HARQ) retransmission timer, pending scheduling request (SR) (SR is transmitted but grant is not yet received), etc.

When designing and operating the MBS split bearer, it is a pertinent question as to how the DRX operation is performed on each of these PTM and PTP reception legs. As can be understood, a poor design and operation strategy may lead to in-efficiency in terms of power consumption (i.e., battery performance). Moreover, it may also affect the transmission/reception synchronization on the two legs resulting in sequence numbers for the service content packets to be out of sync or deviated.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for energy efficient and synchronized reception of multicast/broadcast services in a 5G communication network.

Another aspect of the disclosure is to handle DRX scheduling for MBS in the 5G communication network.

Another aspect of the disclosure is to provide an efficient design for the MBS split bearer which achieves better power performance and/or able to maintain the sequence number synchronization in the 5G communication network. The user experience and device power performance are enhanced. The method can be used to reduce the power consumption.

Additional aspects will be set forth in part in the description which follows and, in part, will be apparent from the description, or may be learned by practice of the presented embodiments.

In accordance with an aspect of the disclosure, a method for handling a multicast and broadcast services (MBS) in a $5^{th}$ generation 5G communication network is provided. The method includes receiving, by a network entity, a request for receiving at least one multicast service from a user equipment (UE). The request includes at least one of a session join request and a service request, which comprises at least one of a temporary mobile group identifier (TMGI) and a MBS session identifier (ID). Further, the method includes configuring, by the network entity, the at least one multicast service based on the request. Further, the method includes sending, by the network entity, the at least one multicast service to the UE over a radio resource control (RRC) reconfiguration message. The RRC reconfiguration message comprises at least one of a point-to-multipoint (PTM) bearer configuration for a PTM mode, a point-to-point (PTP) bearer configuration for a PTP mode, or a split bearer configuration for a split bearer mode.

In an embodiment, the PTM bearer configuration includes at least one set of discontinuous reception (DRX) configuration, a group-radio network temporary identifier (G-RNTI) or group-configured scheduled-radio network temporary identifier (G-CS-RNTI), the TMGI, and the MBS session ID, wherein the DRX configuration comprises at least one of a DRX MBS-On-duration timer, a MBS-inactivity timer, a MBS-retransmission timer-downlink (DL), a MBS-drx-HARQ-round trip time (RTT)-TimerDL and a configuration parameter, wherein the configuration parameter comprises at least one of a MBS-scheduling cycle and MBS-scheduling offset. The DRX configuration for the PTM bearer is per G-RNTI or G-CS-RNTI.

In an embodiment, the UE starts the MBS-drx-HARQ-RTT-TimerDL for a corresponding multicast HARQ process in a first symbol after an end of a corresponding transmission carrying a DL multicast HARQ feedback and stops the MBS-retransmission timer-DL for the corresponding multicast HARQ process, if the physical downlink control channel (PDCCH) indicates a downlink (DL) multicast transmission. The network entity provides the DRX configuration to the UE.

In an embodiment, the UE starts or restarts the MBS-Inactivity timer in a first symbol after an end of a PDCCH reception, if the PDCCH indicates a new multicast transmission for the G-RNTI or G-CS-RNTI.

In an embodiment, the UE starts the MBS-RetransmissionTimer-DL for the corresponding multicast HARQ process in the first symbol after the expiry of MBS-drx-HARQ-RTT-Timer-DL, if a MBS-drx-HARQ-RTT-Timer-DL expires and if the data of the corresponding multicast HARQ process was not successfully decoded.

In an embodiment, the PTP bearer configuration follows a unicast DRX configuration and comprises at least one of a Cell Radio Network Temporary Identifier (C-RNTI) or Configured Scheduled-Radio Network Temporary Identifier (CS-RNTI), the TMGI, and the MBS session ID.

In an embodiment, the split bearer configuration comprises a combination of the PTM bearer configuration and the PTP bearer configuration with at least one of a common TMGI and a common MBS session ID.

In an embodiment, the method includes receiving, by the network entity, a UE assistance information message from the UE, wherein the UE assistance information message comprises at least one of a preferred DRX configuration parameter for a unicast DRX operation and a PTP DRX operation and a targeting better alignment of an active reception period with a MBS scheduling on at least one of a PTM bearer upon determining a misalignment for a DRX configuration for at least one of the PTM bearer and at least one of PTP mode and a unicast mode at the UE. Further, the method includes sending, by the network entity, a response to the UE based on the UE assistance information message, wherein the response includes updated DRX configuration that synchronizes the DRX scheduling of one of PTP DRX configuration and a unicast DRX configuration with DRX configuration for at least one of the PTM bearer.

In accordance with another aspect of the disclosure, a method for handling a MBS in a 5G communication network is provided. The method includes sending, by a UE, a request for receiving at least one multicast service to a network entity. The request comprises at least one of a session join request and a service request comprising at least one of a TMGI and a MBS session ID. Further, the method includes receiving, by the UE, at least one multicast service from the network entity over a radio resource control (RRC) reconfiguration message, wherein the RRC reconfiguration message comprises at least one of a PTM bearer configuration for a PTM mode, a PTP bearer configuration for a PTP mode and a split bearer configuration for a split bearer mode.

In an embodiment, the method further includes determining, by the UE, whether a reception of the MBS service is in the split bearer mode. Further, the method includes performing, by the UE, one of performing, by the UE, at least one of a PTP reception following a same DRX configuration as applied to a PTM reception for the MBS service reception and a PTP bearer provided the same DRX configuration as applied to a unicast traffic reception upon determining that MBS service reception is in the split bearer mode, or performing, by the UE, at least one of a PTP bearer provided a same DRX configuration as applied to the unicast traffic reception and a PTP bearer provided the same DRX configuration as applied to the MBS traffic reception used for PTM bearer delivery for other UEs upon determining that the MBS service reception is not in the split bearer mode and the MBS service reception is in the PTP bearer mode.

In an embodiment, the method further includes determining, by the UE, a misalignment for a DRX configuration for at least one of the PTM bearer and at least one of PTP mode and a unicast mode. The method further includes sending, by the UE, a UE assistance information message to the network entity, wherein the UE assistance information message comprises a preferred DRX configuration parameter for a unicast DRX operation and a PTP DRX operation and a targeting better alignment of active reception period with MBS scheduling on at least one of a PTM bearer. The method further includes receiving, by the UE, a response from the network entity, wherein the response includes updated DRX configuration that synchronizes the DRX scheduling of one of PTP DRX configuration and a unicast DRX configuration with DRX configuration for at least one of the PTM bearer.

In an embodiment, the method further includes determining, by the UE, a misalignment for a DRX configuration for at least one of the PTM bearer and at least one of PTP mode and a unicast mode. The method further includes triggering, by the UE, a scheduling request (SR) so as to come out of a unicast DRX sleep (i.e., an inactive time) on a unicast path or a PTP reception path and operate PTP reception in parallel with PTM MBS reception, when a split radio bearer configuration for PTM radio link control (RLC) bearer and PTP RLC bearer is configured.

In an embodiment, the method further includes determining, by the UE, switching among the PTM mode, the PTP mode and the split bearer mode. Further, the method includes starting, by the UE, a transition timer during the switching. Further, the method includes applying, by the UE, a previous DRX configuration and a new DRX configuration at the UE during the transition timer is running. Further, the method includes abandoning, by the UE, the previous DRX configuration and applying new DRX configuration at the UE after the transition timer is expired.

In accordance with another aspect of the disclosure, a method for handling a MBS in a 5G communication network is provided. The method includes acquiring, by a UE, a MBS Control Channel (MCCH) message, wherein the MCCH message comprising a list of broadcast service, a DRX configuration associated with the list of broadcast services, a G-RNTI or G-CS-RNTI, a TMGI, and a MBS session ID. Further, the method includes receiving, by the UE, the at least one broadcast service based on the MCCH message.

In an embodiment, the DRX configuration for broadcast service comprises at least one of a DRX MBS-On-duration timer, a MBS-inactivity timer and a configuration parameter, wherein the configuration parameter comprises at least one of a MBS-scheduling cycle, and a MBS scheduling offset. The DRX configuration for the PTM bearer (broadcast service) is per G-RNTI or G-CS-RNTI.

In accordance with another aspect of the disclosure, a method for handling a MBS in a 5G communication network is provided. The method includes receiving, by a UE, at least one multicast service. Further, the method includes determining, by the UE, whether an initial HARQ transmission for the at least one multicast service on a PTM path is configured for HARQ retransmission on one of a PTM path and PTP path. Further, the method includes performing, by the UE, at least one of monitoring a G-RNTI or G-CS-RNTI during an active time of a PTM DRX upon determining the initial transmission for the at least one multicast service on the PTM path is configured for retransmission on a PTM path, or monitoring a G-RNTI or G-CS-RNTI and a C-RNTI or CS-RNTI during the active time of a PTM DRX upon determining the initial transmission for the at least one multicast service on the PTM path is configured for retransmission on the PTP path, or monitoring a G-RNTI or G-CS-RNTI during active time of PTM DRX and a C-RNTI or CS-RNTI during the time when retransmission on the PTP for the initial transmission of the PTM is expected upon determining the initial transmission for the at least one multicast service on the PTM path is configured or expected for retransmission on the PTP path. The active time of PTM DRX configured for a G-RNTI or G-CS-RNTI includes the time when at least one of DRX MBS-On-duration timer, a MBS-inactivity timer, a MBS-retransmission timer-DL running. Monitoring a C-RNTI or CS-RNTI for retransmission on the PTP for the initial transmission of the PTM is determined when MBS-retransmission timer-DL timer for PTM is running.

In an embodiment, when the active time of the PTM path and the PTP path matches, multiplex PTM and PTP in different medium access control (MAC) packet data packets (PDUs) in same slot and addressed by the G-RNTI or G-CS-RNTI and the C-RNTI or CS-RNTI. In another embodiment, when the active time of the PTM path and the PTP path matches, multiplex PTP and unicast in same MAC PDU and addressed both by the C-RNTI or CS-RNTI. In another embodiment, when the active time of the PTM path and the PTP path matches, multiplex PTM and PTP in same MAC PDU and addressed both by the G-RNTI or G-CS-RNTI.

In accordance with another aspect of the disclosure, a network entity for handling a MBS in a 5G communication network is provided. The network entity includes a DRX scheduling based MBS service controller coupled with a processor and a memory. The DRX scheduling based MBS service controller is configured to receive a request for receiving at least one multicast service from a UE. The request includes at least one of a session join request and a service request comprising at least one of a TMGI and a MBS session ID. The DRX scheduling based MBS service controller is configured to configure the at least one multicast service based on the request. The DRX scheduling based MBS service controller is configured to send at least one multicast service to the UE over a RRC reconfiguration message. The RRC reconfiguration message includes at least one of a PTM bearer configuration for a PTM mode, a PTP bearer configuration for a PTP mode and a split bearer configuration for a split bearer mode.

In accordance with another aspect of the disclosure, a user equipment (UE) for handling a MBS in a 5G communication network is provided. The UE includes a DRX scheduling based MBS service controller coupled with a processor and a memory. The DRX scheduling based MBS service controller is configured to send a request for receiving at least one multicast service to a network entity, wherein the request comprises at least one of a session join request and a service request comprising at least one of a TMGI and a MBS session ID. The DRX scheduling based MBS service controller is configured to receive at least one multicast service from the network entity over a RRC reconfiguration message, wherein the RRC reconfiguration message comprises at least one of a PTM bearer configuration for a PTM mode, a Point-To-Point (PTP) bearer configuration for a PTP mode and a split bearer configuration for a split bearer mode.

In accordance with another aspect of the disclosure, a UE for handling a MBS in a 5G communication network is provided. The UE includes a DRX scheduling based MBS service controller coupled with a processor and a memory. The DRX scheduling based MBS service controller is configured to acquire a MCCH message, wherein the MCCH message comprising a list of broadcast services, a Discontinuous Reception (DRX) configuration associated with the list of broadcast services, a G-RNTI or G-CS-RNTI, a TMGI, and a MBS session ID. The DRX scheduling based MBS service controller is configured to receive the at least one broadcast service based on the MCCH message.

In accordance with another aspect of the disclosure, a UE for handling a MBS in a 5G communication network is provided. The UE includes a DRX scheduling based MBS service controller coupled with a processor and a memory. The DRX scheduling based MBS service controller is configured to receive at least one multicast service. The DRX scheduling based MBS service controller is configured to determine whether an initial transmission for the at least one multicast service on a PTM path is configured for retransmission on one of a PTM path and PTP path. The DRX scheduling based MBS service controller is configured to perform at least one of monitor a G-RNTI or G-CS-RNTI during an active time of a PTM DRX upon determining the initial transmission for the at least one multicast service on the PTM path is configured for retransmission on a PTM path, or monitor a G-RNTI or G-CS-RNTI and a C-RNTI or CS-RNTI during the active time of a PTM DRX upon determining the initial transmission for the at least one multicast service on a PTM path is configured for retransmission on the PTP path, or monitor a G-RNTI or G-CS-RNTI during active time of PTM DRX and a C-RNTI or CS-RNTI during the time when retransmission on PTP for the initial transmission of the PTM is expected upon determining the initial transmission for the at least one multicast service on a PTM path is configured or expected for retransmission on the PTP path. The active time of PTM DRX configured for a G-RNTI or G-CS-RNTI includes the time when at least one of DRX MBS-On-duration timer, a MBS-inactivity timer, a MBS-retransmission timer-DL running. The monitoring the C-RNTI or the CS-RNTI for retransmission on the PTP for the initial transmission of the PTM is determined when the MBS-retransmission timer-DL timer for the PTM is running.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
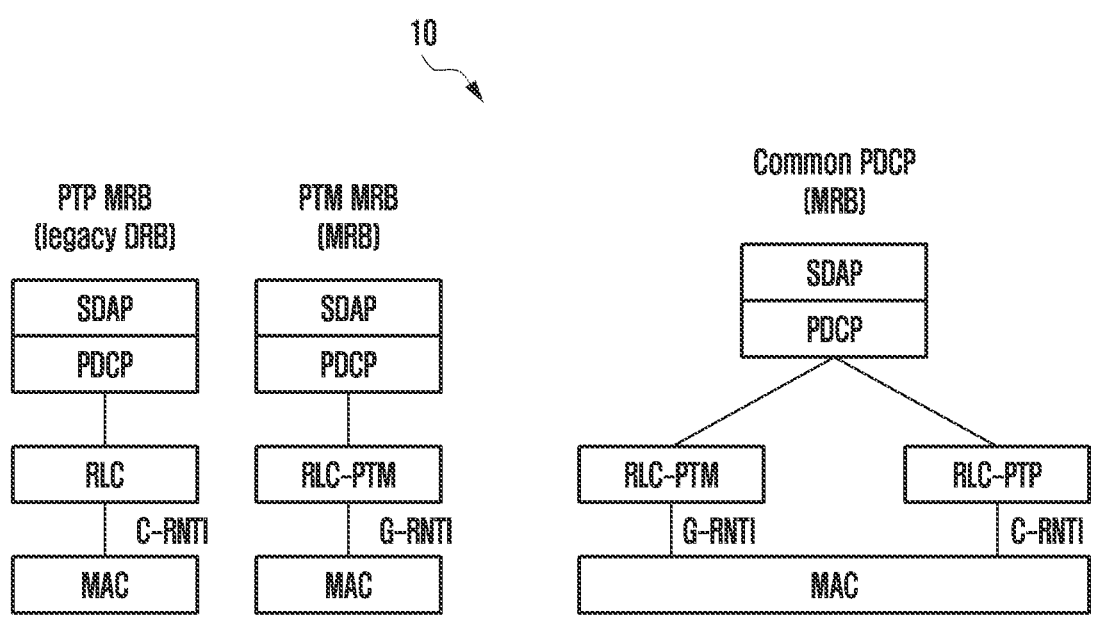
FIG. 1 depicts the architecture for a protocol stack for a user equipment (UE) implementation supporting multicast and broadcast services (MBS), according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Accordingly, the embodiments herein disclose methods for handling a multicast and broadcast services (MBS) in a $5^{th}$ generation (5G) communication network. The method includes receiving, by a network entity, a request for receiving at least one multicast service from a user equipment (UE). The request includes at least one of a session join request and a service request comprising at least one of a temporary mobile group identifier (TMGI) and a MBS session identifier (ID). Further, the method includes configuring, by the network entity, the at least one multicast service based on the request. Further, the method includes sending, by the network entity, at least one multicast service to the UE over a radio resource control (RRC) reconfiguration message. The RRC reconfiguration message comprises at least one of a point-to-multipoint (PTM) bearer configuration for a PTM mode, a point-to-point (PTP) bearer configuration for a PTP mode and a split bearer configuration for a split bearer mode.

The proposed method can be used for energy efficient and synchronized reception of multicast/broadcast services in the 5G communication network. The proposed method can be used for handling discontinuous reception (DRX) scheduling for multicast services in the 5G communication network. The proposed method can be used for providing an efficient design for the MBS split bearer which achieves better power performance and/or able to maintain the sequence number synchronization in the 5G communication network. The user experience and device power performance are enhanced. The method can be used to reduce the power consumption.

Referring now to the drawings, and more particularly to FIG. 2 to FIG. 9, where similar reference characters denote corresponding features consistently throughout the figures, there are shown at least one embodiment.

FIG. 1 depicts the architecture for a protocol stack 10 for a UE implementation supporting MBS according to an embodiment of the disclosure. Mainly, three types of radio bearer architecture are shown, and are as follows:

1. PTP radio link control (RLC) bearer based (PTP MRB),
2. PTM RLC bearer based (PTM MRB), and
3. PTM+PTP RLC bearers based (MBS split bearer).

The RLC PTM can be based on Unacknowledged Mode (UM) RLC, which does not support functionality of automatic repeat request (ARQ); i.e., no RLC level transmission are supported as there is no feedback or status report between transmitting a sending RLC entity. Whereas RLC PTP can be either UM mode or acknowledged mode (AM) RLC. AM RLC supports status/feedback sharing from receiver to transmitter and retransmission of negatively acknowledged, i.e., negative acknowledgement (NACK) RLC packets from transmitter to receiver. Thereby, there is a further enhancement in the reliability that can be ensured with the AM RLC layer. Effectively, there is a lossless operation is achieved with utilizing AM RLC mode.

PDCP layer performs reordering operation and employs a reordering timer t-Reordering to ensure the out of order packets received from RLC (from two RLCs in MBS split bearer) are re-arranged in order of their sequence numbers (SN) before expiry of reordering timer t-Reordering. In case reordering timer expires, and there is still a gap with PDCP receive window (i.e., missing a PDCP PDU SN so that reordering, and in-sequence delivery could not be done to the higher layer), PDCP moves its receive window (i.e., update its state variable RX_DELIV) further and performs the delivery of PDCP PDUs received until window's lower edge, RX_DELIV (of course gap of missing PDCP PDU SN is also delivered).

Having an MBS split bearer with both PTM RLC and PTP RLC bearer adds to the reliability of the MBS bearer as lossless operation is achieved from the PTP path where as PTM path provides the packet with lesser delay as no retransmission is involved albeit with possible loss. With combining these two paths through the PDCP reordering operation, there is higher chances of receiving PDCP PDUs before t-Reordering expiry and providing ordered in-sequence delivery to the higher layer.

Figure 2:
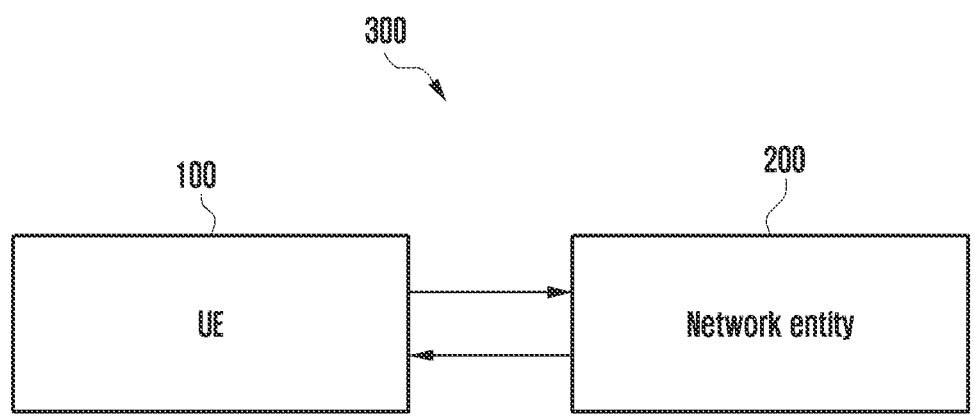
FIG. 2 is an overview of a 5th generation (5G) communication network for handling the MBS, according to an embodiment of the disclosure.

FIG. 2 is an overview of a 5G communication network (300) for handling the MBS, according to an embodiment of the disclosure.

Referring to FIG. 2, the 5G communication network (300) includes a UE (100) and a network entity (200). The UE (100) can be, for example, but not limited to a laptop, a desktop computer, a notebook, a relay device, a vehicle to everything (V2X) device, a smartphone, a tablet, an internet of things (IoT) device, an immersive device, a virtual reality device, a foldable device, a Television with communication facility, a connected car or the like. The network entity (200) may also include or be referred to by those skilled in the art as a base station, a base transceiver station, a radio base station, an access point, a radio transceiver, an eNB, a gNodeB (gNB), or the like.

The network entity (200) is configured to receive a request for receiving a multicast service from the UE (100). The request comprises a session join request and a service request comprising at least one of a TMGI and a MBS session ID. Based on the request, the network entity (200) is configured to configure the multicast service. After the configuration, the network entity (200) is configured to send the multicast service to the UE (100) over a RRC reconfiguration message. The RRC reconfiguration message includes at least one of a PTM bearer configuration for a PTM mode, a PTP bearer configuration for a PTP mode and a split bearer configuration for a split bearer mode.

In an embodiment, the PTM bearer configuration includes at least one set of DRX configuration, a G-RNTI or G-CS-RNTI, the TMGI, and the MBS session ID. The DRX configuration comprises a DRX MBS-On-duration timer (i.e., drx-onDurationTimerPTM), a MBS-inactivity timer (i.e., drx-InactivityTimerPTM), a MBS-retransmission timer-DL (i.e., drx-RetransmissionTimerDLPTM), a MBS-drx-HARQ-RTT-TimerDL (i.e., drx-HARQ-RTT-TimerDLPTM) and a configuration parameter. The configuration parameter includes a MBS-scheduling cycle (i.e., drx-LongCycleStartOffsetPTM) and MBS-scheduling offset (i.e., drx-SlotOffsetPTM). The active time of PTM DRX configured for a G-RNTI or G-CS-RNTI includes the time when at least one of DRX MBS-On-duration timer, MBS-inactivity timer and MBS-retransmission timer-DL running.

In an embodiment, the UE starts the MBS-drx-HARQ-RTT-TimerDL for a corresponding multicast HARQ process in a first symbol after an end of a corresponding transmission carrying a DL multicast HARQ feedback and stops the MBS-retransmission timer-DL for the corresponding multicast HARQ process, if the PDCCH indicates a DL multicast transmission. In an embodiment, the UE starts or restarts the MBS-Inactivity timer in a first symbol after an end of a PDCCH reception, if the PDCCH indicates a new multicast transmission for the G-RNTI or G-CS-RNTI. In an embodiment, the UE starts the MBS-RetransmissionTimer-DL for the corresponding multicast HARQ process in the first symbol after the expiry of MBS-drx-HARQ-RTT-TimerDL, if a MBS-drx-HARQ-RTT-Timer-DL expires and if the data of the corresponding multicast HARQ process was not successfully decoded.

In an embodiment, the PTP bearer configuration follows a unicast DRX configuration and comprises at least one of a C-RNTI or CS-RNTI, the TMGI, and the MBS session ID. In an example, a legacy UE-specific DRX pattern for unicast is reused for the PTP transmission of NR MBS, which means the UE specific DRX pattern are for both unicast services and the MBS PTP bearer of the UE (100). In an embodiment, the split bearer configuration comprises a combination of the PTM bearer configuration and the PTP bearer configuration with at least one of a common TMGI and a common MBS session ID.

In an embodiment, the UE (100) is configured to determine whether a reception of the MBS service is in the split bearer mode. Based on determining that MBS service reception is in the split bearer mode, the UE (100) is configured to perform at least one of a PTP reception path following a same DRX configuration as applied to a PTM reception path for the MBS service reception and a PTP bearer provided the same DRX configuration as applied to a unicast traffic reception. Based on determining that the MBS service reception is not in the split bearer mode and the MBS service reception is in the PTP bearer mode, the UE (100) is configured to perform at least one of a PTP bearer provided a same DRX configuration as applied to the unicast traffic reception and a PTP bearer provided the same DRX configuration as applied to the MBS traffic reception used for PTM bearer delivery for other UEs.

In an embodiment, the UE (100) is configured to determine a misalignment for a DRX configuration for at least one of the PTM bearer and at least one of PTP mode and a unicast mode. Further, the UE (100) is configured to send a UE assistance information message to the network entity (200). The UE assistance information message includes a preferred DRX configuration parameter for the unicast DRX operation and PTP DRX operation and a targeting better alignment of active reception period with MBS scheduling on at least one of a PTM bearer. Each PTM bearer may have different DRX configurations. The UE (100) may be engaged in one or more PTM bearers at a time, depending on number services it is availing. Further, the UE (100) is configured to receive a response from the network entity (200). The response synchronizes the DRX scheduling of one of PTP DRX configuration and a unicast DRX configuration with DRX configuration for at least one of the PTM bearer.

In an embodiment, the UE (100) is configured to determine a misalignment for a DRX configuration for at least one of the PTM mode and at least one of PTP mode and a unicast mode. Based on the determination, the UE (100) is configured to trigger a SR so as to come out of a unicast DRX sleep (i.e., an inactive time) on a unicast path or a PTP reception path and operate PTP reception in parallel with PTM MBS reception, when a split radio bearer configuration for PTM RLC bearer and PTP RLC bearer is configured.

In an embodiment, the UE (100) is configured to determine switching among the PTM mode, the PTP mode and the split bearer mode and start a transition timer at the switching. Further, the UE (100) is configured to apply a previous DRX configuration and a new DRX configuration at the UE (100) during the transition timer is running. Further, the UE (100) is configured to abandon the previous DRX configuration and applying only new DRX configuration at the UE (100) after the transition timer is expired.

In an embodiment, the UE (100) is configured to acquire a MCCH message. The MCCH message includes a list of broadcast service, a DRX configuration associated with the list of broadcast services, a G-RNTI or G-CS-RNTI, the TMGI, and a MBS session ID. Based on the MCCH message, the UE (100) receives the broadcast service. In an embodiment, the DRX configuration includes a DRX MBS-On-duration timer (e.g., drx-onDurationTimerPTM), a MBS-inactivity timer (e.g., drx-InactivityTimerPTM) and a configuration parameter. The configuration parameter includes a MBS-scheduling cycle (e.g., drx-LongCycleStartOffsetPTM), and a MBS scheduling offset (e.g., drx-SlotOffsetPTM). The active time of PTM DRX configured for a G-RNTI or G-CS-RNTI includes the time when at least one of DRX MBS-On-duration timer and a MBS-inactivity timer is running.

In an embodiment, the UE (100) is configured to receive at least one multicast service and determine whether an initial transmission for the multicast service on the PTM path is configured for retransmission on one of the PTM path and the PTP path. Based on determining the initial transmission for the multicast service on the PTM path is configured for retransmission on a PTM path, the UE (100) is configured to monitor a G-RNTI or G-CS-RNTI during an active time of a PTM DRX.

In another embodiment, based on determining the initial transmission for the multicast service on a PTM path is configured for retransmission on the PTP path, the UE (100) is configured to monitor a G-RNTI or G-CS-RNTI and a C-RNTI or CS-RNTI during the active time of a PTP DRX. In another embodiment, based on determining the initial transmission for the multicast service on a PTM path is configured for retransmission on the PTP path, the UE (100) is configured to monitor a G-RNTI or G-CS-RNTI during active time of PTM DRX and a C-RNTI or CS-RNTI during the time when retransmission on PTP for the initial transmission of the PTM is expected. The monitoring the C-RNTI or the CS-RNTI for retransmission on the PTP for the initial transmission of the PTM is determined when the MBS-retransmission timer-DL timer for the PTM is running.

Further, in an embodiment, when the active time of the PTM path and the PTP path matches, multiplex PTM and PTP in different MAC PDUs in same slot and addressed by the G-RNTI or G-CS-RNTI and the C-RNTI or CS-RNTI. Further, in another embodiment, when the active time of the PTM path and the PTP path matches, multiplex PTP and unicast in same MAC PDU and addressed both by the C-RNTI or CS-RNTI. Further, in another embodiment, when the active time of the PTM path and the PTP path matches, multiplex PTM and PTP in same MAC PDU and addressed both by the G-RNTI or G-CS-RNTI.

In an example, the reception of MBS services needs to be informed to receiving UEs (100) so that the UEs (100) can adopt DRX (Discontinuous reception), when the desired MBS service is not being transmitted. That implies, the multiple MBS services being transmitted by the network entity (200) will have their DRX scheduling configuration. The DRX configuration consists of some timer configuration values, specifically DRX MBS-On-duration timer, MBS-Inactivity timer, MBS-Retransmission timer-DL, MBS-drx-HARQ-RTT-TimerDL and configuration parameters like MBS-SchedulingCycle and MBS-SchedulingOffset. The DRX MBS-On-duration timer is started at the beginning of each DRX cycle and the UE (100) wakes up for decode possible scheduling of specific service. Each of these services can be scheduled anytime in the active time as per the DRX scheduling configuration. That, DRX configuration is per G-RNTI or G-CS-RNTI. Basically, the UE (100) decodes for the relevant G-RNTI or G-CS-RNTI for the downlink control information (DCI) scheduling the physical downlink shared channel (PDSCH) allocation for the specific service. Each MBS service may have a dedicated G-RNTI or G-CS-RNTI and the UE (100) interested to receive a specific service will decode for relevant G-RNTI or G-CS-RNTI. MBS-Inactivity timer guides the UE (100) to be awake for a stipulated time period and if no allocation is scheduled for the UE (100), the UE (100) can undertake sleep.

The DRX MBS-Retransmission-DL timer may be needed in New Radio (NR) to track the possible HARQ retransmission of the downlink allocation. For example, in NR, when a specific service or the UE (100) requires reliability, HARQ retransmission can be applied. In effect, when one or more of these timers are running, the UE (100) will be in active time and undertakes decoding and reception of the relevant MBS service(s). The DRX timers as per the DRX configurations also help the UE (100) to achieve power saving by sleeping the UE (100) that is not supposed to be in active time for the specified MBS service. The MBS-Scheduling- Cycle and MBS-SchedulingOffset configure the scheduling period and beginning of the scheduling period respectively.

Whereas unicast reception follows a different DRX configuration including a set of timers, e.g., DRX on-duration timer, inactivity timer, retransmission timer and so on. The scheduling is through DCI addressed to the C-RNTI or CS-RNTI of the connected mode UE. The Unicast DRX is guided by its own set of DRX configuration timers and configuration parameters and it is common for all unicast services that the UE accesses in connected mode utilizing its C-RNTI or CS-RNTI.

With the MBS split bearer receiving MBS services on two paths of PTM and PTP RLC bearer, there is a timing mismatch in terms of transmission from gNB and/or reception by the UE (100) on the two paths. This is essentially because PTM is real time transmission with unicast mode and in accordance with MBS service scheduling whereas PTP path, if follows, unicast DRX scheduling is timed with a different configuration. As a result, the UE (100) may receive the packets on these two paths at separate times and the advantage of combining the packets on two paths to achieve enhanced reliability is affected. Moreover, PTP bearer may use AM RLC and therefore, some of the packets may get delayed to retransmissions or other reasons.

In an embodiment herein, one of the following configurations are provided by the gNB and applied at the UE (100):

In the split bearer configuration, the PTP reception path follows the same DRX configuration as applied to the PTM reception path for MBS service reception. Effectively, split bearer configuration provides a common DRX configuration for both PTM and PTP reception paths. Alternatively, configuration parameters could be such that they are integral multiple or sub-multiple of each other, e.g., DRX cycle for PTM MBS reception path is double of DRX cycle that is used for PTP reception path and so on. Additionally, for PTP bearer operation in uplink configuration for MBS-Retransmission timer-UL, and MBS-drx-HARQ-RTT-TimerDL are also provided and used.

In the split bearer configuration, the PTP bearer is provided the same DRX configuration as applied to the unicast traffic reception.

In the stand-alone bearer configuration, the PTP bearer is provided the same DRX configuration as applied to the unicast traffic reception.

In the stand-alone bearer configuration, the PTP bearer is provided the same DRX configuration as applied to the MBS traffic reception used for PTM bearer delivery for other UEs.

The proposed method can be used to synchronize DRX scheduling configuration and conserve power, as well keep PDCP sequence number reception time matching on two paths of PTM and PTP, and Unicast mode.

In an embodiment, the network entity (200) applies the DRX configuration that provides better synchronization between active MBS services DRX scheduling and Unicast DRX configuration. The gNB knows the DRX configuration of the PTM MBS services which the UE (100) is availing. Further, the gNB adapts the DRX configuration used by the UE (100) for unicast mode of reception and/or PTP bearer DRX scheduling to match with the PTM MBS DRX scheduling (e.g., MBS-SchedulingCycle and MBS-SchedulingOffset), so that their active time matches to the maximum possible. For this purpose, the gNB adapts the DRX offset and/or DRX cycle for the unicast DRX configuration and signals the updated DRX configuration to the UE (100) through RRC reconfiguration message. On receiving, the UE (100) applies the received updated DRX configuration. Alternatively, the network schedules traffic on unicast/PTP path such that inactivity timer of the UE (100) for unicast/PTP reception expires and the UE goes to sleep or no monitoring for unicast/PTP control channel like PDCCH at the same time UE is not receiving MBS service on PTM path.

In an embodiment, the UE (100) utilizes the RRC signaling (e.g., UE assistance information message) for providing preferred DRX configurations parameters for unicast or PTP DRX operation, so as to better match active reception period with MBS scheduling on PTM path. For this, the UE (100) provides at least one of preferred DRX offset, DRX cycle, Inactivity timer, Retransmission timer value. These values are computed and determined by the UE (100) such that it matches with the active time of DRX cycle used for MBS service reception on PTM path (e.g., the UE (100) will try to match to the MBS-SchedulingCycle and MBS-SchedulingOffset values of the specific MBS service). In another embodiment, the UE (100) provides the same set of DRX configuration parameters for the MBS service(s), which the UE (100) is interested or receiving.

In an embodiment, the UE (100) triggers the Scheduling Request (SR) so as to come out of unicast DRX sleep or inactive time on unicast or PTP reception path and operate PTP reception in parallel with PTM MBS reception, when in split radio bearer configuration for PTM and PTP RLC bearers. Once SR is triggered, if there is dedicated uplink resource for SR transmission, the UE (100) undertakes SR transmission on uplink and comes out DRX sleep or inactive time and start monitoring for the control channel for uplink grant or allocation. When there is no dedicated resource for SR transmission, the UE (100) undertakes RACH (Random Access Channel) mechanism to avail grants. With this unicast or PTP DRX is broken, and the UE (100) comes in active time. To synchronize the active time for unicast or PTP path with MBS reception on PTM, the UE (100) triggers SR at the beginning of MBS scheduling period or at start of MBS DRX cycle.

In an embodiment, PTP RLC bearer path accessing MBS service through C-RNTI or CS-RNTI is given a dedicated DRX configuration which is different than other unicast services as well as different from MBS DRX scheduling for the relevant MBS service on the PTM path. This is to separate out DRX configuration of MBS service on PTP from rest of the unicast services. This also simplifies the operation of PTP bearer with a more suitable DRX configuration and is also not affected with other procedures which may be applicable for regular unicast services DRX operations. For example, Power saving related operations are not applied to the reception of the MBS with PTP RLC bearer path. In another embodiment herein, the network entity (200) does not configure power saving for UEs (100) receiving MBS service on PTP bearer.

In an embodiment, when the active time of PTM and PTP reception path matches, the MBS service data pertaining to two paths are multiplexed in the same MAC PDU or TB and identified by their respective logical channels. This is the case when the UE (100) uses G-RNTI or G-CS-RNTI for MBS service for both the PTM and PTP paths. In case, G-RNTI or G-CS-RNTI is used for PTM and C-RNTI or CS-RNTI for PTP, service data is received on separate MAC PDUs or TBs and possibly over the same time slot. In this case, the PTP service data can be multiplexed with unicast service data when both are addressed with same C-RNTI or CS-RNTI. In summary, a) Multiplex PTM and PTP in same MAC PDU and addressed both by G-RNTI or G-CS-RNTI b) Multiplex PTM and PTP in different MAC PDUs in same slot and addressed by G-RNTI or G-CS-RNTI and C-RNTI or CS-RNTI respectively c) Multiplex PTP and unicast in same MAC PDU and addressed both by C-RNTI or CS-RNTI In an embodiment, when PTP and unicast can be multiplexed in same MAC PDU and addressed by C-RNTI or CS-RNTI, however, they are following different DRX scheduling configurations (e.g., MBS DRX scheduling and Unicast DRX scheduling respectively), the respective DRX timers (e.g., Inactivity timer etc.) are not affected by the packet reception of the other. That is unicast inactivity timer is not affected (e.g., no change in start/stop/running operation) when the packet received pertains to PTP RLC bearer and vice-versa. The packets for these different DRX configurations are distinguished by their logical channel identities during de-multiplexing and accordingly handled.

In an embodiment herein, for MBS active time on PTP reception path, DRX inactivity timer starts if one of defined conditions is satisfied.

Option 1. Uplink grant addressed to C-RNTI or CS-RNTI.

Option 2. Uplink grant addressed to C-RNTI or CS-RNTI and the MAC PDU contains data from PTP RLC.

Option 3. Uplink grant addressed to C-RNTI or CS-RNTI and MBS DRX inactivity timer start is configured.

Option 4. Uplink grant addressed to C-RNTI or CS-RNTI and the MAC PDU contains data from PTP RLC and MBS DRX inactivity timer start is configured.

In an embodiment, the configuration for the PTM, PTP and MBS split bearer (PTP+PTM) is provided through RRC reconfiguration message in connected mode. In another embodiment herein, the configuration could also be provided in system information block or MCCH message. The configuration included DRX scheduling configuration as well and either as separate configuration for PTM and PTP RLC bearers or a common configuration for both.

Similarly, reconfiguration or modification of the configuration is applied either separately or together. i.e.:

Option 1: Signaled MBS DRX scheduling configuration/reconfiguration/modification applies to PTM reception path.

Option 2: Signaled MBS DRX scheduling configuration/reconfiguration/modification applies to both PTM and PTP reception paths.

In an embodiment, during switching operation (PTP to PTM or PTM to PTP) and bearer mode switching (PTM, PTP and MBS split bearer), in order to cope up with different DRX scheduling configurations and therefore timings, in the proposed approach there is transition timer when both the paths or bearer modes, i.e., old and new are kept activated and data reception is performed from both. PDCP which is common takes care for the duplicate removal and combining of the multiple streams. This way lossless switching and/or bearer mode change is achieved.

In an embodiment, the gNB sends a MAC control element (CE) indicating no more scheduling of data for the logical channel pertaining to the PTM RLC bearer or PTP RLC bearer or both of the PTM and PTP RLC bearers. On reception of MAC CE indicating no more scheduling of pertinent RLC bearer(s), corresponding PTM and/or PTP path applies the DRX operation, i.e., it can go to sleep or stop monitoring for data allocation control channel. MAC CE includes at least one of the logical channel identity or identities or G-RNTI(s) or G-CS-RNTI(s)/C-RNTI(s) or CS-RNTI(s) or TMGI(s) of the pertinent paths or MBS services. When PTM and PTP MBS RLC bearers are multiplexed on same MAC PDU or transport block (TB), a common MAC CE can be used to indicate one or both bearers. When there is no multiplexing of PTP and PTM RLC bearers on same MAC PDU or TB, a distinct MAC CE is used for indicating for respective RLC bearer.

Figure 3:
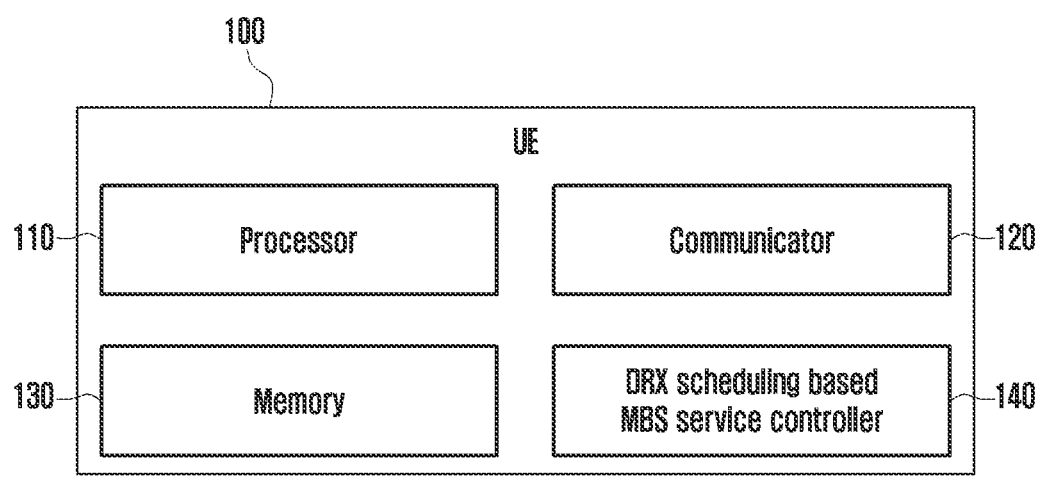
FIG. 3 shows various hardware components of a UE, according to an embodiment of the disclosure.

FIG. 3 shows various hardware components of the UE (100), according to an embodiment of the disclosure.

Referring to FIG. 3, the UE (100) includes a processor (110), a communicator (120), a memory (130) and a DRX scheduling based MBS service controller (140). The processor (110) is coupled with the communicator (120), the memory (130) and the DRX scheduling based MBS service controller (140).

The DRX scheduling based MBS service controller (140) is configured to send the request for receiving the multicast service to the network entity (200). Based on the request, the DRX scheduling based MBS service controller (140) is configured to receive the multicast service from the network entity (200) over the RRC reconfiguration message. The RRC reconfiguration message includes at least one of the PTM bearer configuration for the PTM mode, the PTP bearer configuration for the PTP mode and the split bearer configuration for the split bearer mode.

Further, the DRX scheduling based MBS service controller (140) is configured to determine whether the reception of the MBS service is in the split bearer mode. Upon determining that MBS service reception is in the split bearer mode, the DRX scheduling based MBS service controller (140) is configured to perform at least one of a PTP reception path following a same DRX configuration as applied to a PTM reception path for the MBS service reception and a PTP bearer provided the same DRX configuration as applied to a unicast traffic reception. Upon determining that the MBS service reception is not in the split bearer mode and the MBS service reception is in the PTP bearer mode, the DRX scheduling based MBS service controller (140) is configured to perform at least one of a PTP bearer provided a same DRX configuration as applied to the unicast traffic reception and a PTP bearer provided the same DRX configuration as applied to the MBS traffic reception used for PTM bearer delivery for other UEs.

In an embodiment, the DRX scheduling based MBS service controller (140) is configured to determine a misalignment for a DRX configuration for at least one of the PTM bearer and at least one of PTP mode and a unicast mode. Further, the DRX scheduling based MBS service controller (140) is configured to send a UE assistance information message to the network entity (200). Further, the DRX scheduling based MBS service controller (140) is configured to receive a response from the network entity (200). The response synchronizes the DRX scheduling of one of PTP DRX configuration and a unicast DRX configuration with DRX configuration for at least one of the PTM bearer.

In an embodiment, the DRX scheduling based MBS service controller (140) is configured to determine the misalignment for a DRX configuration for at least one of the PTM mode and at least one of PTP mode and the unicast mode. Further, the DRX scheduling based MBS service controller (140) is configured to trigger a SR so as to come out of a unicast DRX sleep (i.e., an inactive time) on a unicast path or a PTP reception path and operate PTP reception in parallel with PTM MBS reception, when a split radio bearer configuration for PTM RLC bearer and PTP RLC bearer is configured.

In an embodiment, the DRX scheduling based MBS service controller (140) is configured to determine switching among the PTM mode, the PTP mode and the split bearer mode. Further, the DRX scheduling based MBS service controller (140) is configured to start a transition timer at the switching. The DRX scheduling based MBS service controller (140) is configured to apply a previous DRX configuration and a new DRX configuration at the UE (100) during the transition timer is running. The DRX scheduling based MBS service controller (140) is configured to abandon the previous DRX configuration and apply only new DRX configuration at the UE (100) after the transition timer is expired.

In an embodiment, the DRX scheduling based MBS service controller (140) is configured to acquire the MCCH message. The MCCH message includes a list of broadcast service, a DRX configuration associated with the list of broadcast services, the G-RNTI or G-CS-RNTI, the TMGI, and the MBS session ID. Based on the MCCH message, the DRX scheduling based MBS service controller (140) is configured to receive the broadcast service.

In an embodiment, the DRX scheduling based MBS service controller (140) is configured to receive the multicast service. Further, the DRX scheduling based MBS service controller (140) is configured to determine whether the initial transmission for the multicast service on the PTM path is configured for retransmission on one of the PTM path and the PTP path. Upon determining the initial transmission for the multicast service on the PTM path is configured for retransmission on the PTM path, the DRX scheduling based MBS service controller (140) is configured to monitor the G-RNTI or G-CS-RNTI during the active time of the PTM DRX.

Upon determining the initial transmission for the multicast service on the PTM path is configured for retransmission on the PTP path, the DRX scheduling based MBS service controller (140) is configured to monitor the G-RNTI or G-CS-RNTI and the C-RNTI or CS-RNTI during the active time of the PTM DRX.

Upon determining the initial transmission for the at least one multicast service on the PTM path is configured for retransmission on the PTP path, the DRX scheduling based MBS service controller (140) is configured to monitor the G-RNTI or the G-CS-RNTI during the active time of PTM DRX and the C-RNTI or CS-RNTI during the time when retransmission on the PTP for the initial transmission of the PTM is expected. The monitoring the C-RNTI or the CS-RNTI for retransmission on the PTP for the initial transmission of the PTM is determined when the MBS-retransmission timer-DL timer for the PTM is running.

The DRX scheduling based MBS service controller (140) is physically implemented by analog or digital circuits such as logic gates, integrated circuits, microprocessors, micro-controllers, memory circuits, passive electronic components, active electronic components, optical components, hardwired circuits, or the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard disks, optical discs, floppy disks, flash memories, or forms of erasable programmable read only memories (EPROMs) or electrically erasable and programmable ROMs (EE-PROMs). In addition, the memory (130) may, in some examples, be considered a non-transitory storage medium.

The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (110). The processor (110) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function in the UE (100).

Figure 4:
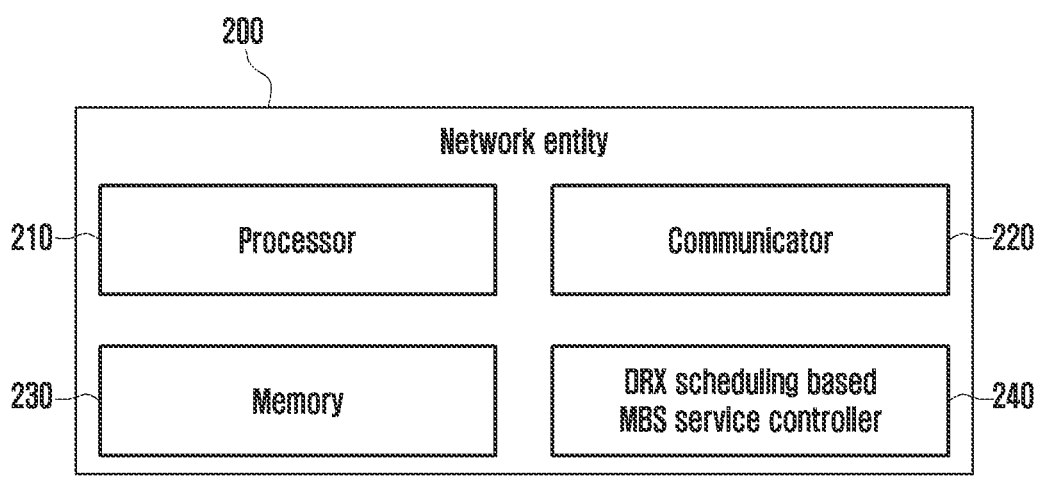
FIG. 4 shows various hardware components of a network entity, according to an embodiment of the disclosure.

FIG. 4 shows various hardware components of the network entity (200), according to an embodiment of the disclosure.

Referring to FIG. 4, the network entity (200) includes a processor (210), a communicator (220), a memory (230) and a DRX scheduling based MBS service controller (240). The processor (210) is coupled with the communicator (220), the memory (230) and the DRX scheduling based MBS service controller (240).

The DRX scheduling based MBS service controller (240) is configured to receive the request for receiving the multicast service from the UE (100). Based on the request, the DRX scheduling based MBS service controller (240) is configured to configure the multicast service. After configuration, the DRX scheduling based MBS service controller (240) is configured to send the multicast service to the UE (100) over the RRC reconfiguration message.

The DRX scheduling based MBS service controller (240) is configured to receive the UE assistance information message from the UE (100). The UE assistance information message includes at least one of a preferred DRX configuration parameter for the unicast DRX operation and PTP DRX operation and a targeting better alignment of active reception period with a MBS scheduling on at least one of a PTM bearer upon determining a misalignment for a DRX configuration for at least one of the PTM bearer and at least one of PTP mode and a unicast mode at the UE (100). The DRX scheduling based MBS service controller (240) is configured to send the response to the UE (100) based on the UE assistance information message. The response synchronizes the DRX scheduling of one of PTP DRX configuration and a unicast DRX configuration with DRX configuration for at least one of the PTM bearer.

The DRX scheduling based MBS service controller (240) is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of EPROM or EEPROM memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Further, at least one of the plurality of modules/controller may be implemented through the AI model. A function associated with the AI model may be performed through the non-volatile memory, the volatile memory, and the processor (210). The processor (210) may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 4 shows various hardware components of the network entity (200) but it is to be understood that other embodiments are not limited thereon. In other embodiments, the network entity (200) may include less or more number of components. Further, the labels or names of the components are used only for illustrative purpose and does not limit the scope of the disclosure. One or more components can be combined together to perform same or substantially similar function in the network entity (200).

Figure 5:
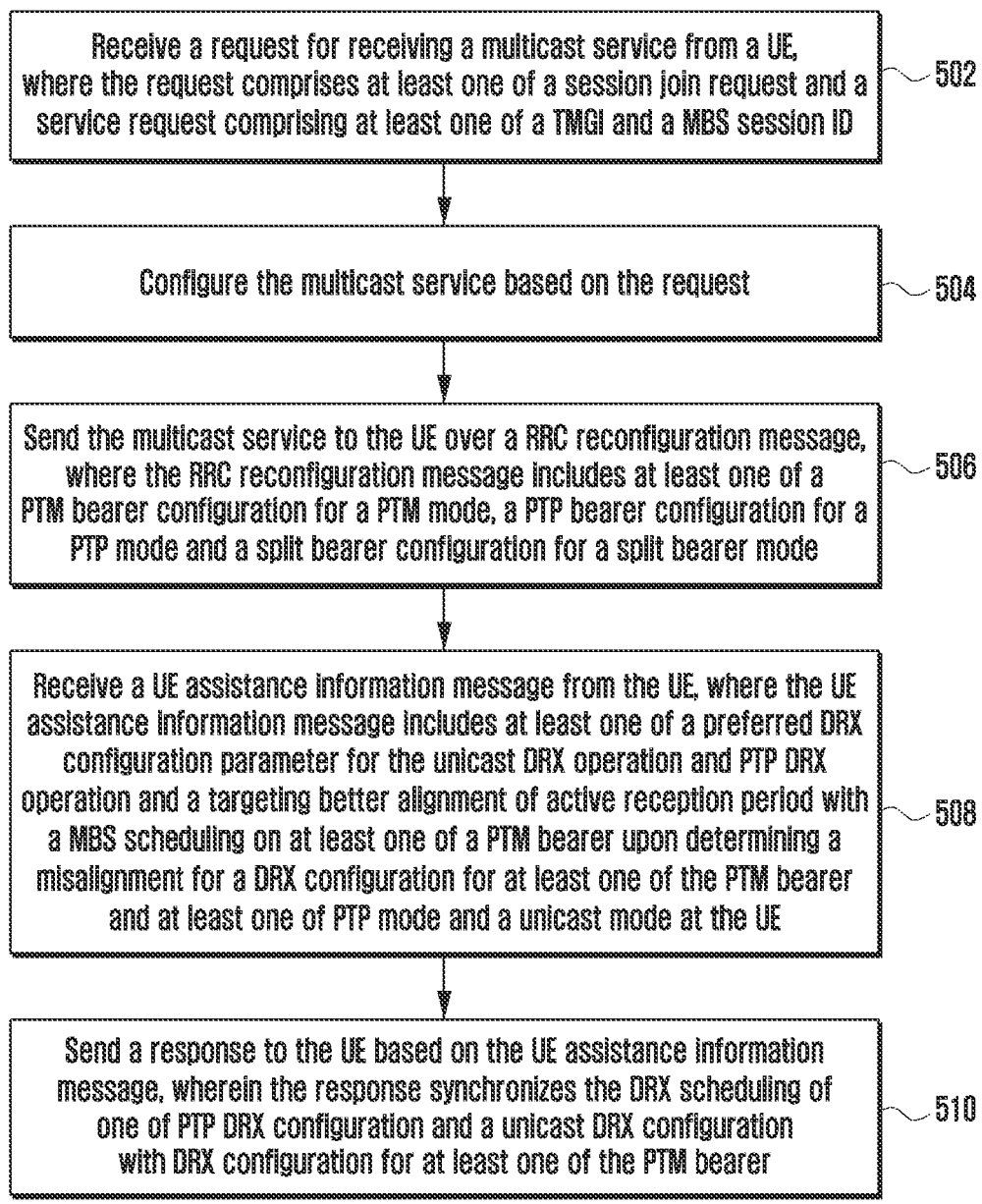
FIG. 5 is a flowchart illustrating a method, implemented by the network entity, for handling the multicast service in the 5G communication network, according to an embodiment of the disclosure.

FIG. 5 is a flowchart illustrating a method, implemented by the network entity (200), for handling the multicast service in the 5G communication network (300), according to an embodiment of the disclosure. The operations 502 to 510 are handled by the DRX scheduling based MBS service controller (240).

Referring to FIG. 5, at operation 502, the method includes receiving the request for receiving the multicast service from the UE (100), where the request includes at least one of the session join request and the service request comprising at least one of the TMGI and the MBS session ID. At operation 504, the method includes configuring the multicast service based on the request. At operation 506, the method includes sending the multicast service to the UE (100) over a RRC reconfiguration message. The RRC reconfiguration message includes at least one of the PTM bearer configuration for the PTM mode, the PTP bearer configuration for the PTP mode and the split bearer configuration for the split bearer mode.

At operation 508, the method includes receiving the UE assistance information message from the UE (100). The UE assistance information message includes at least one of a preferred DRX configuration parameter for the unicast DRX operation and PTP DRX operation and a targeting better alignment of active reception period with a MBS scheduling on at least one of a PTM bearer upon determining a misalignment for a DRX configuration for at least one of the PTM bearer and at least one of PTP mode and a unicast mode at the UE (100). At operation 510, the method includes sending the response to the UE (100) based on the UE assistance information message. The response synchronizes the DRX scheduling of one of PTP DRX configuration and a unicast DRX configuration with DRX configuration for at least one of the PTM bearer.

FIGS. 6A, 6B, 6C, 6D, and to 6E are flow charts illustrating a method, implemented by the UE (100), for handling the multicast service in the 5G communication network (300), according to various embodiments of the disclosure. The operations 502 to 628 are handled by the DRX scheduling based MBS service controller (140).

Figure 6A:
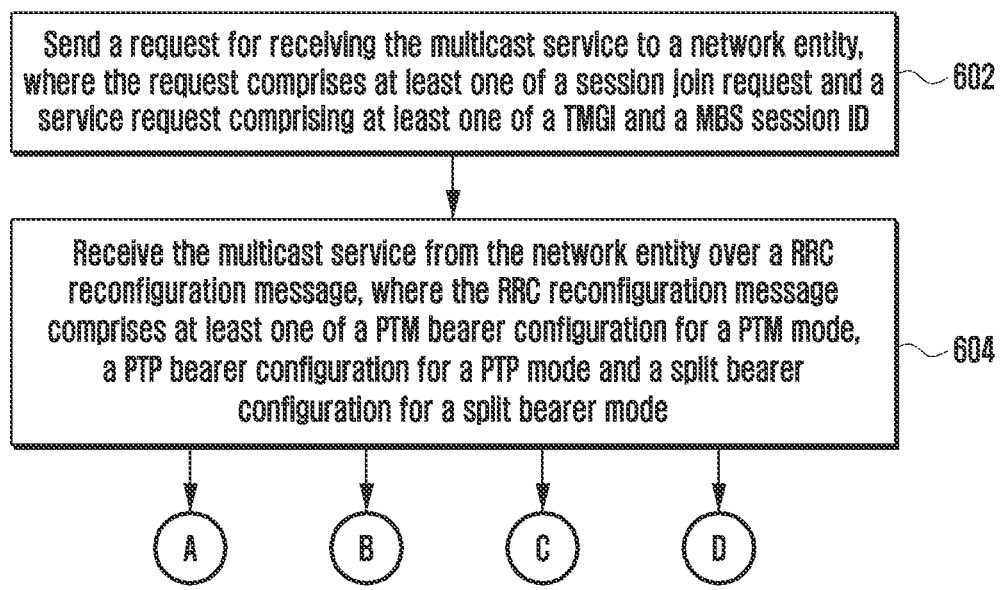
FIG. 6A is a flowchart illustrating a method, implemented by the UE, for handling the multicast service in the 5G communication network, according to embodiments of the disclosure.

Referring to FIG. 6A, at operation 602, the method includes sending the request for receiving the multicast service to the network entity (200). The request includes at least one of the session join request and the service request comprising at least one of the TMGI and the MBS session ID. At operation 604, the method includes receiving the multicast service from the network entity (200) over the RRC reconfiguration message. The RRC reconfiguration message includes at least one of the PTM bearer configuration for the PTM mode, the PTP bearer configuration for the PTP mode, or the split bearer configuration for the split bearer mode.

Figure 6B:
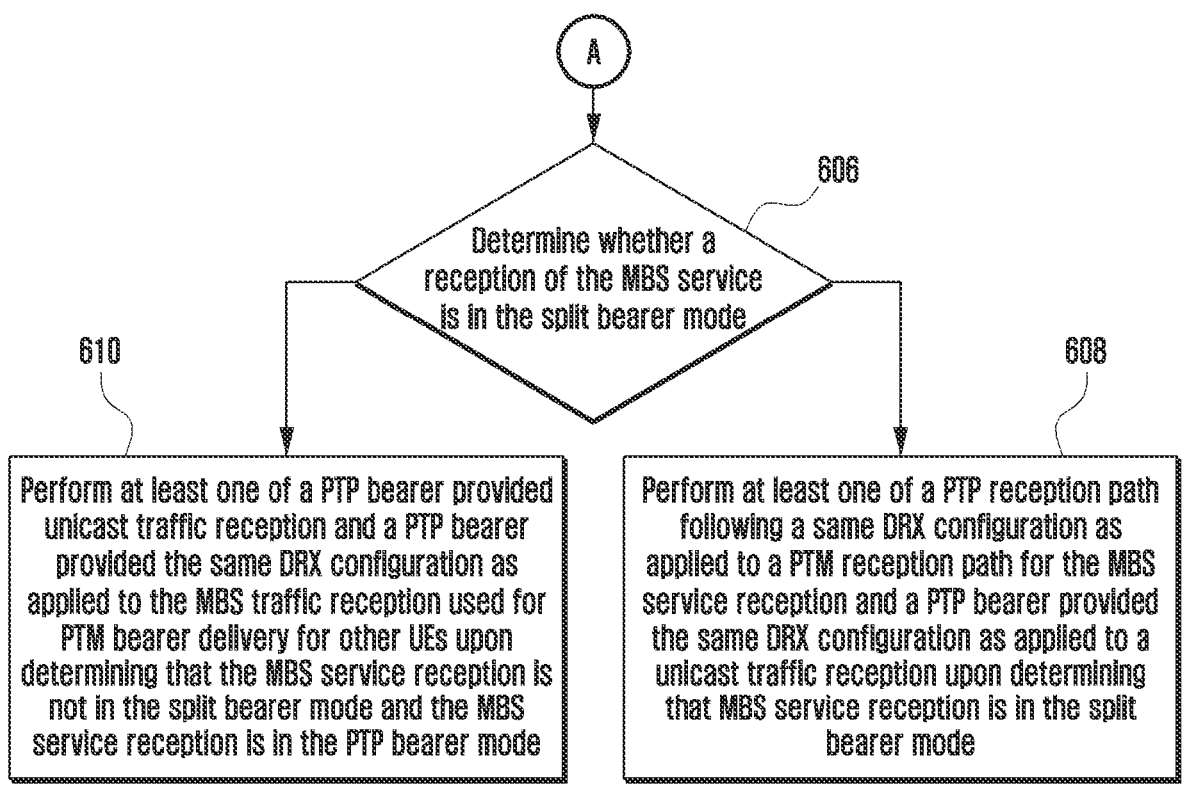
FIG. 6B is a flowchart illustrating a method, implemented by the UE, for handling the multicast service in the 5G communication network, according to embodiments of the disclosure.

Referring to FIG. 6B, at operation 606, the method includes determining whether the reception of the MBS service is in the split bearer mode. Upon determining that MBS service reception is in the split bearer mode, at operation 608, the method includes performing at least one of a PTP reception path following a same DRX configuration as applied to a PTM reception path for the MBS service reception and a PTP bearer provided the same DRX configuration as applied to a unicast traffic reception. Upon determining that the MBS service reception is not in the split bearer mode and the MBS service reception is in the PTP bearer mode, at operation 610, the method includes performing at least one of a PTP bearer provided a same DRX configuration as applied to the unicast traffic reception and a PTP bearer provided the same DRX configuration as applied to the MBS traffic reception used for PTM bearer delivery for other UEs.

Figure 6C:
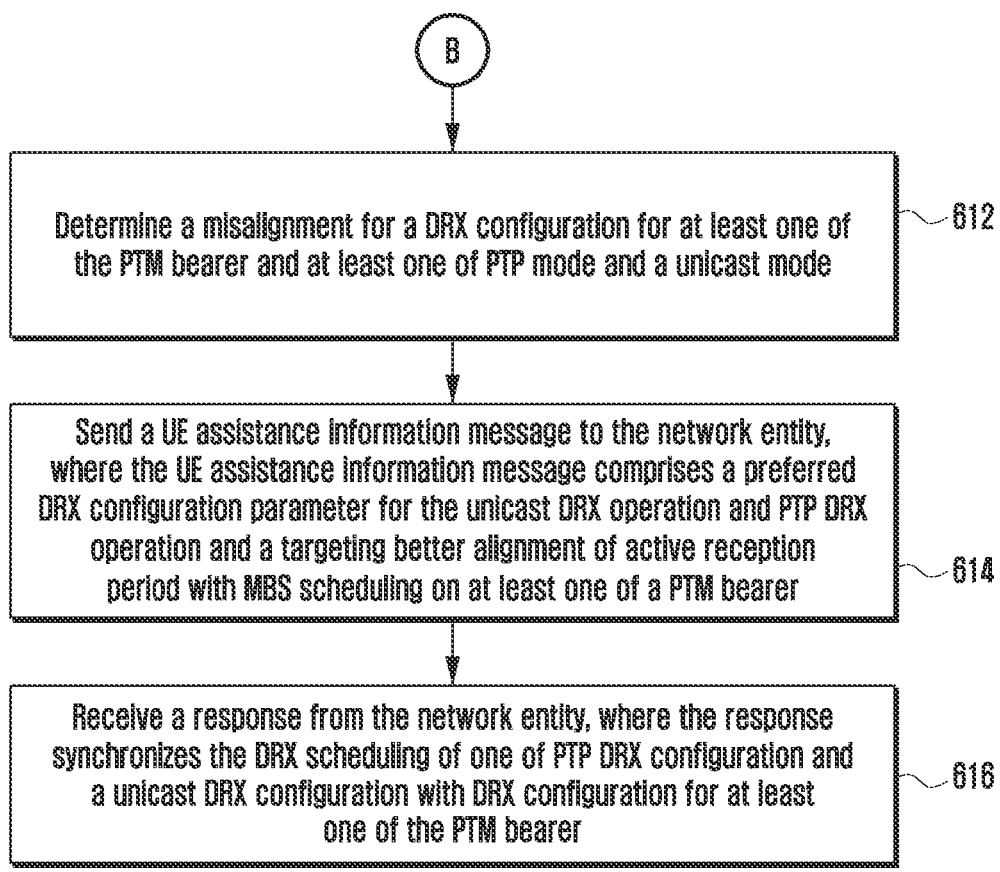
FIG. 6C is a flowchart illustrating a method, implemented by the UE, for handling the multicast service in the 5G communication network, according to embodiments of the disclosure.

Referring to FIG. 6C, at operation 612, the method includes determining a misalignment for a DRX configuration for at least one of the PTM bearer and at least one of PTP mode and a unicast mode. At operation 614, the method includes sending a UE assistance information message to the network entity (200). The UE assistance information message comprises a preferred DRX configuration parameter for the unicast DRX operation and PTP DRX operation and a targeting better alignment of active reception period with MBS scheduling on at least one of the PTM bearer. At operation 616, the method includes receiving a response from the network entity (200). The response synchronizes the DRX scheduling of one of PTP DRX configuration and a unicast DRX configuration with DRX configuration for at least one of the PTM bearer.

Figure 6D:
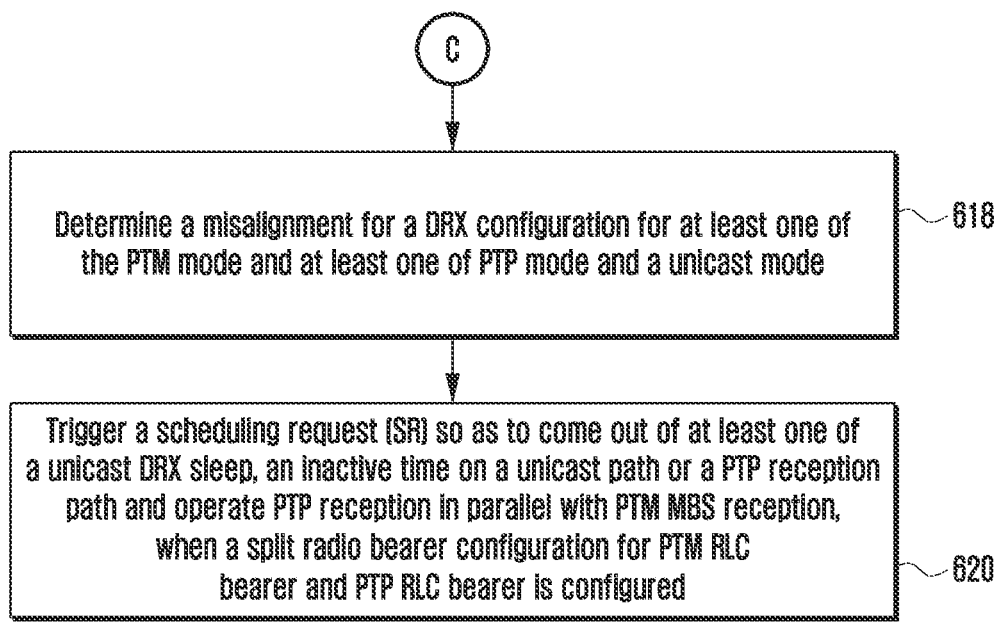
FIG. 6D is a flowchart illustrating a method, implemented by the UE, for handling the multicast service in the 5G communication network, according to embodiments of the disclosure.

Referring to FIG. 6D, at operation 618, the method includes determining the misalignment for a DRX configuration for at least one of the PTM mode and at least one of PTP mode and the unicast mode. At operation 620, the method includes triggering a SR so as to come out of a unicast DRX sleep (i.e., an inactive time) on a unicast path or a PTP reception path and operate PTP reception in parallel with PTM MBS reception, when a split radio bearer configuration for PTM RLC bearer and PTP RLC bearer is configured.

Figure 6E:
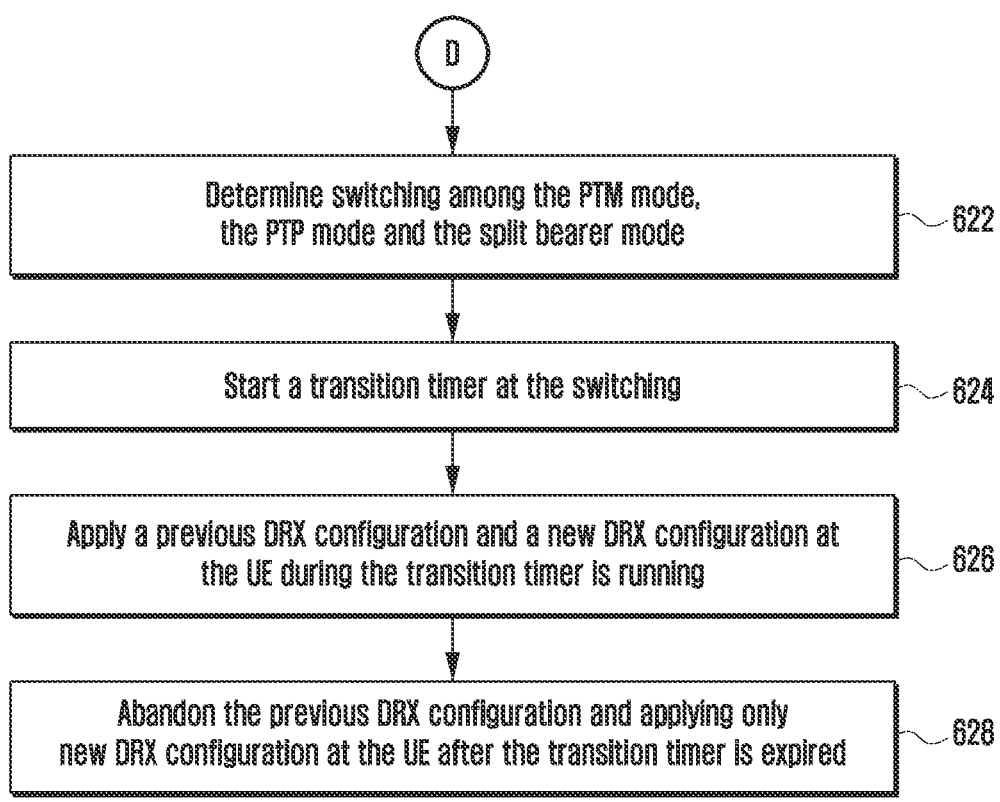
FIG. 6E is a flowchart illustrating a method, implemented by the UE, for handling the multicast service in the 5G communication network, according to embodiments of the disclosure.

Referring to FIG. 6E, at operation 622, the method includes determining switching among the PTM mode, the PTP mode and the split bearer mode. At operation 624, the method includes starting a transition timer at the switching. At operation 626, the method includes applying a previous DRX configuration and a new DRX configuration at the UE (100) during the transition timer is running. At operation 628, the method includes abandoning the previous DRX configuration and applying only new DRX configuration at the UE (100) after the transition timer is expired.

Figure 7:
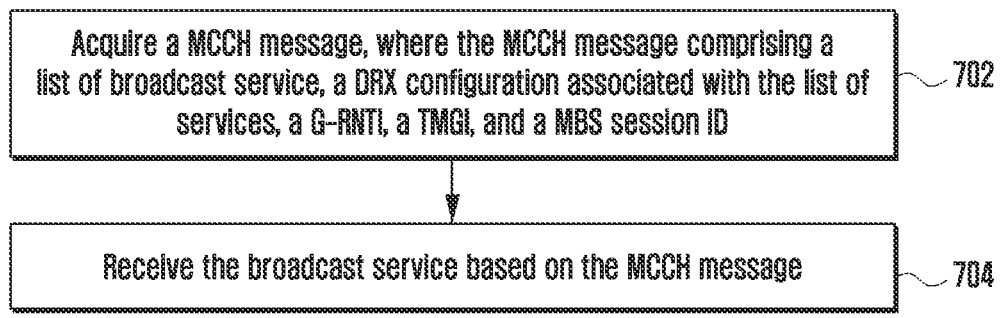
FIG. 7 is a flowchart illustrating a method, implemented by the UE, for handling the broadcast service in the 5G communication network based on a MBS Control Channel (MCCH) message, according to an embodiment of the disclosure.

FIG. 7 is a flowchart illustrating a method, implemented by the UE (100), for handling the broadcast service in the 5G communication network (300) based on the MCCH message, according to an embodiment of the disclosure. The operations 702 to 704 are handled by the DRX scheduling based MBS service controller (140).

Referring to FIG. 7, at operation 702, the method includes acquiring the MCCH message. The MCCH message includes a list of broadcast service, a DRX configuration associated with the list of broadcast services, the G-RNTI or G-CS-RNTI, the TMGI, and the MBS session ID. At operation 704, the method includes receiving the broadcast service based on the MCCH message.

Figure 8:
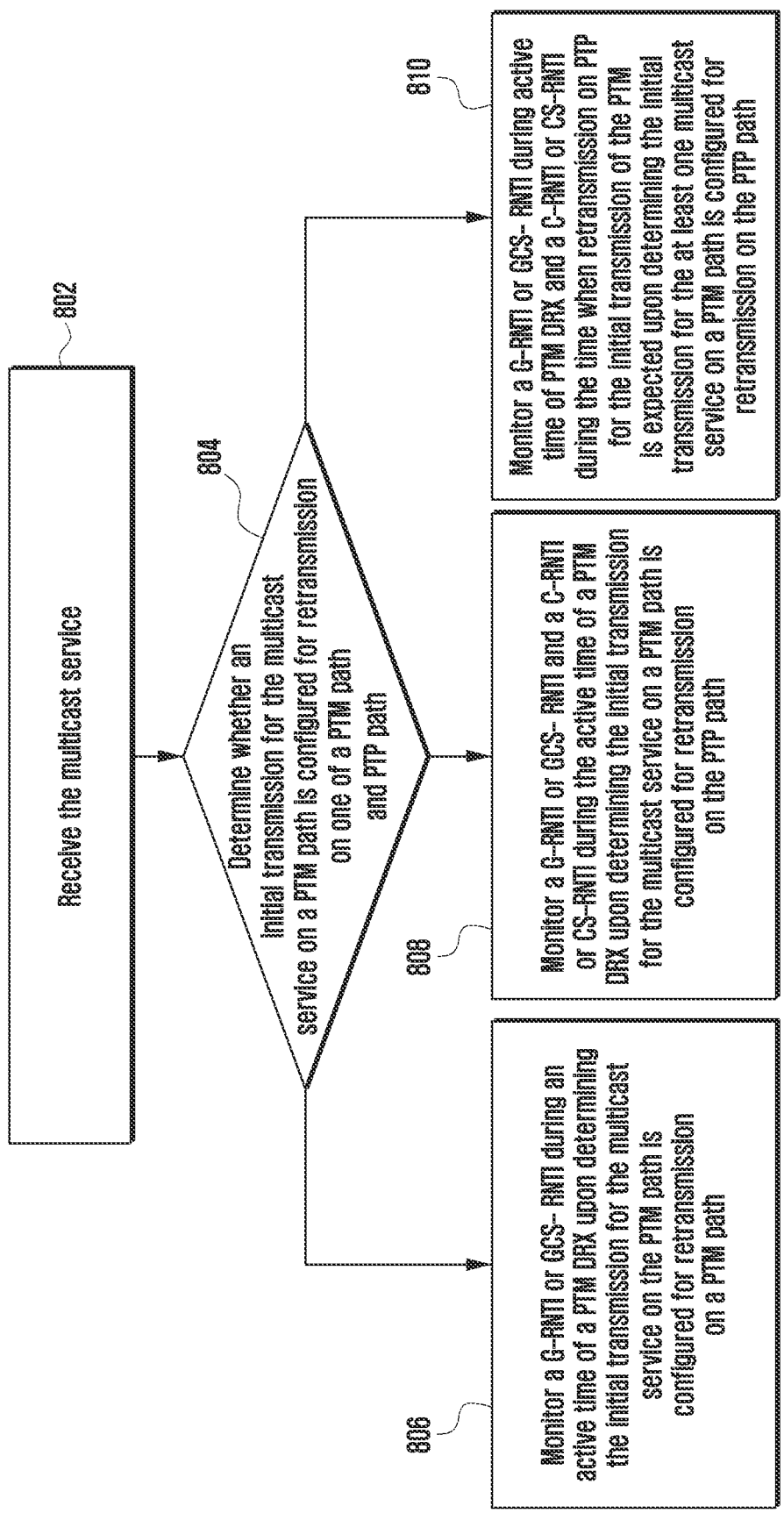
FIG. 8 is a flowchart illustrating a method, implemented by the UE, for handling the multicast service in the 5G communication network by determining whether an initial transmission for the multicast service on a point-to-multipoint (PTM) path configured for retransmission on one of a PTM path and point-to-point (PTP path, according to an embodiment of the disclosure.

FIG. 8 is a flowchart illustrating a method, implemented by the UE (100), for handling the multicast service in the 5G communication network (300) by determining whether the initial transmission for the multicast service on the PTM path configured for retransmission on one of the PTM path and PTP path, according to an embodiment of the disclosure. The operations 802 to 810 are handled by the DRX scheduling based MBS service controller (140).

Referring to FIG. 8, at operation 802, the method includes receiving the multicast service. At operation 804, the method includes determining whether the initial transmission for the multicast service on the PTM path is configured for retransmission on one of the PTM path and the PTP path. At operation 806, the method includes monitoring the G-RNTI or G-CS-RNTI during the active time of the PTM DRX upon determining the initial transmission for the multicast service on the PTM path is configured for retransmission on the PTM path.

At operation 808, the method includes monitoring the G-RNTI or G-CS-RNTI and the C-RNTI or CS-RNTI during the active time of the PTM DRX upon determining the initial transmission for the multicast service on the PTM path is configured for retransmission on the PTP path. At operation 810, the method includes monitoring the G-RNTI or the G-CS-RNTI during the active time of PTM DRX and the C-RNTI or CS-RNTI during the time when retransmission on the PTP for the initial transmission of the PTM is expected upon determining the initial transmission for the at least one multicast service on the PTM path is configured or expected for retransmission on the PTP path. The monitoring the C-RNTI or the CS-RNTI for retransmission on the PTP for the initial transmission of the PTM is determined when the MBS-retransmission timer-DL timer for the PTM is running.

Figure 9:
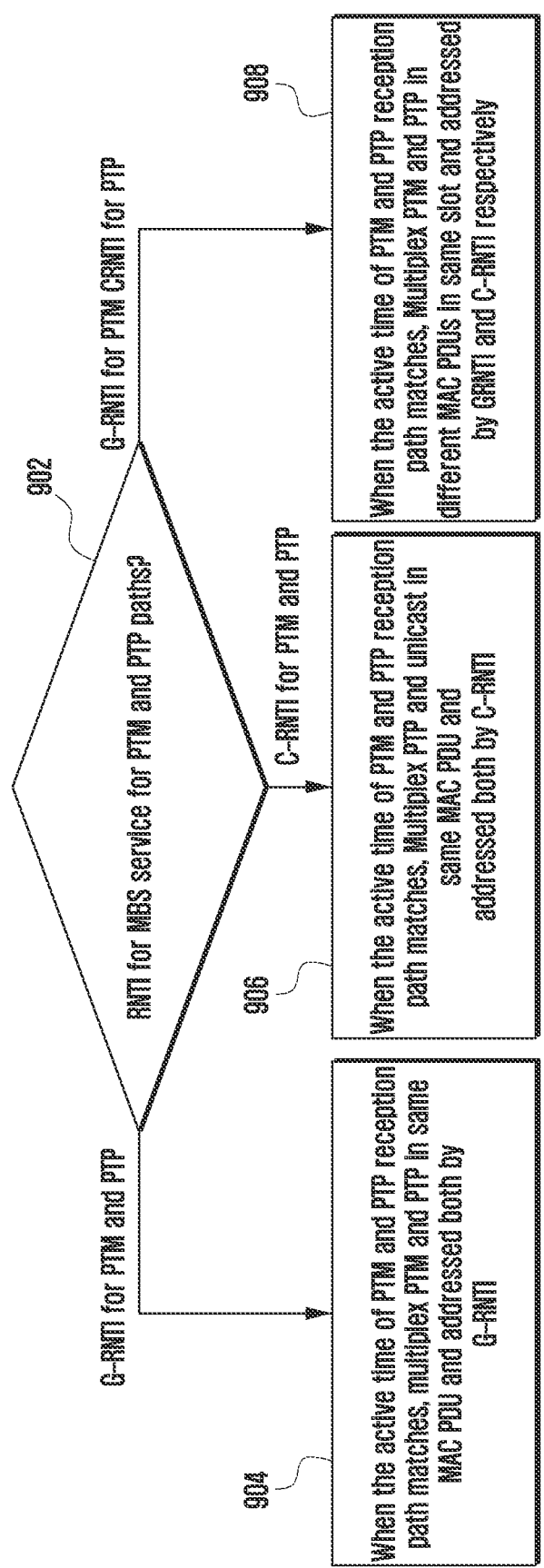
FIG. 9 is a flowchart illustrating a method, implemented by the UE, for handling the multicast service in the 5G communication network by determining radio network temporary identifier (RNTI) for MBS service for PTM and PTP paths, according to an embodiment of the disclosure.

FIG. 9 is a flowchart illustrating a method, implemented by the UE (100), for handling the multicast service in the 5G communication network (300) by determining whether the RNTI for the MBS service for the PTM and PTP paths, according to an embodiment of the disclosure. The operations 902 to 908 are handled by the DRX scheduling based MBS service controller (140).

Referring to FIG. 9, at operation 902, the method includes determining whether the RNTI for the MBS service for the PTM and PTP paths. At operation 904, when the active time of PTM and PTP reception path matches, multiplex PTM and PTP in same MAC PDU and addressed both by the G-RNTI. At operation 906, when the active time of PTM and PTP reception path matches, multiplex PTP and unicast in same MAC PDU and addressed both by the C-RNTI or CS-RNTI. At operation 908, when the active time of PTM and PTP reception path matches, multiplex PTM and PTP in different MAC PDUs in same slot and addressed by G-RNTI or G-CS-RNTI and C-RNTI or CS-RNTI respectively.

The various actions, acts, blocks, operations, or the like in the flowcharts included herein may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:
   receiving, via radio resource control (RRC) signaling, a first discontinuous reception (DRX) configuration for point-to-multipoint (PTM) transmission of multicast broadcast service (MBS), wherein the first DRX configuration is associated with a group-radio network temporary identifier (G-RNTI) for the MBS;
   identifying a first active time based on a first value for a downlink (DL) PTM retransmission timer included in the first DRX configuration; and
   monitoring, during the first active time, first downlink control information (DCI) addressed to the G-RNTI, wherein the first active time includes a time while the DL PTM retransmission timer is running,
   wherein the DL PTM retransmission timer is used for a hybrid automatic repeat request (HARQ) retransmission corresponding to downlink allocation of the first DCI.

2. The method of claim 1,
   wherein the first DRX configuration further includes at least one of a DL PTM on-duration timer or a DL PTM inactivity timer, and
   wherein the first active time further includes at least one of a time while the DL PTM on-duration timer is running or a time while the DL PTM inactivity timer is running.

3. The method of claim 1, further comprising:
   receiving, via the RRC signaling, a second DRX configuration for point-to-point (PTP) transmission of the MBS;
   identifying a second active time based on a second value for a timer for the PTP transmission included in the second DRX configuration, wherein the timer for the PTP transmission includes at least one of an on-duration timer for the PTP transmission, an inactivity timer for the PTP transmission or a retransmission timer for the PTP transmission; and
   monitoring, during the second active time, second DCI addressed to a cell-RNTI (C-RNTI), wherein the second active time includes a time while the identified timer for the PTP transmission is running.

4. The method of claim 3, further comprising:
   starting the inactivity timer in case that an uplink grant indicating an uplink transmission associated with the PTP transmission is received.

5. The method of claim 1, further comprising stopping monitoring the first DCI in case that a medium access control (MAC) control element (CE) corresponding to the G-RNTI is received, wherein the MAC CE is used for controlling a DRX operation for the PTM transmission.

6. The method of claim 1,
   wherein the first DRX configuration further includes a DL PTM HARQ round trip time (RTT) timer, information on a DRX cycle for the PTM transmission, and a DRX offset for the PTM transmission, and
   wherein the HARQ retransmission is received via the PTM transmission.

7. The method of claim 1, wherein the first DRX configuration is identified by the G-RNTI among a plurality of first DRX configurations respectively configured for a plurality of G-RNTIs configured to the UE.

8. The method of claim 3, wherein the second DRX configuration is for both unicast transmission and the PTP transmission.

9. The method of claim 1, further comprising:
   receiving an MBS control channel (MCCH) message including broadcast DRX configuration associated with the MBS; and
   monitoring a third PDCCH for a PTM transmission for the MBS based on the broadcast DRX configuration.

10. The method of claim 6, wherein the DL PTM retransmission timer for a HARQ process is started in a first symbol after the DL PTM HARQ RTT timer for the G-RNTI is expired in case that data of the HARQ process was not successfully decoded.

11. The method of claim 6, wherein the DL PTM HARQ RTT timer for a HARQ process is started in a first symbol after end of a transmission of a DL HARQ feedback.

12. The method of claim 1, wherein MBS bearer (MRB) configurations for the MBS are received via the RRC signaling,
   wherein the MRB configurations include:
   a first MRB configuration associated with an unacknowledged mode (UM) radio link control (RLC) for a PTP transmission;
   a second MRB configuration associated with an acknowledged mode (AM) RLC for the PTP transmission; and
   a third MRB configuration associated with an UM RLC for the PTM transmission.

13. A user equipment (UE) in a communication system, the UE comprising:
   a transceiver; and
   a processor coupled with the transceiver and configured to:
      receive, via radio resource control (RRC) signaling, a first discontinuous reception (DRX) configuration for point-to-multipoint (PTM) transmission of multicast broadcast service (MBS), wherein the first DRX configuration is associated with a group-radio network temporary identifier (G-RNTI) for the MBS;
      identify a first active time based on a first value for a downlink (DL) PTM retransmission timer included in the first DRX configuration; and
      monitor, during the first active time, first downlink control information (DCI) addressed to the G-RNTI, wherein the first active time includes a time while the DL PTM retransmission timer is running, wherein the DL PTM retransmission timer is used for a hybrid automatic repeat request (HARQ) retransmission corresponding to downlink allocation of the first DCI.

14. The UE of claim 13,
wherein the first DRX configuration further includes at least one of a DL PTM on-duration timer or a DL PTM inactivity timer, and
wherein the first active time further includes at least one of a time while the DL PTM on-duration timer is running or a time while the DL PTM inactivity timer for is running.

15. The UE of claim 13, wherein the processor is further configured to:
receive, via the RRC signaling, a second DRX configuration for point-to-point (PTP) transmission of the MBS;
identify a second active time based on a second value for a timer for the PTP transmission included in the second DRX configuration, wherein the timer for the PTP transmission includes at least one of an on-duration timer for the PTP transmission, an inactivity timer for the PTP transmission or a retransmission timer for the PTP transmission; and
monitor, during the second active time, second DCI addressed to a cell-RNTI (C-RNTI), wherein the second active time includes a time while the identified timer for the PTP transmission is running.

16. The UE of claim 15, wherein the processor is further configured to:
start the inactivity timer in case that an uplink grant indicating an uplink transmission associated with the PTP transmission is received.

17. The UE of claim 13, wherein the processor is further configured to stop monitoring the first DCI in case that a medium access control (MAC) control element (CE) corresponding to the G-RNTI is received, wherein the MAC CE is used for controlling a DRX operation for the PTM transmission.

18. The UE of claim 15, wherein the second DRX configuration is for both unicast transmission and the PTP transmission.

19. A method performed by a base station in a communication system, the method comprising:
transmitting, via radio resource control (RRC) signaling, a first multicast discontinuous reception (DRX) configuration for point-to-multipoint (PTM) transmission of multicast broadcast service (MBS), wherein the first DRX configuration is associated with a group-radio network temporary identifier (G-RNTI) for the MBS; and
transmitting, during a first active time, first downlink control information (DCI) addressed to the G-RNTI,
wherein the first active time includes a time while a downlink (DL) PTM retransmission timer for the G-RNTI included in the first DRX configuration is running, and
wherein the DL PTM retransmission timer is used for a hybrid automatic repeat request (HARQ) retransmission corresponding to downlink allocation of the first DCI.

20. A base station in a communication system, the base station comprising:
a transceiver; and
a processor coupled with the transceiver and configured to:
transmit, via radio resource control (RRC) signaling, a first multicast discontinuous reception (DRX) configuration for point-to-multipoint (PTM) transmission of multicast broadcast service (MBS), wherein the first DRX configuration is associated with a group-radio network temporary identifier (G-RNTI) for the MBS; and
transmit, during a first active time, first downlink control information (DCI) addressed to the G-RNTI,
wherein the first active time includes a time while a downlink (DL) PTM retransmission timer for the G-RNTI included in the first DRX configuration is running, and
wherein the DL PTM retransmission timer is used for a hybrid automatic repeat request (HARQ) retransmission corresponding to downlink allocation of the first DCI.

* * * * *